M. ATWOOD.
RUNNING-GEAR.

No. 191,017. Patented May 22, 1877.

WITNESSES:
H. Rydquist
J. H. Scarborough

INVENTOR:
M. Atwood
BY
[signature]
ATTORNEYS.

N. PETERS, PHOTO-LITHOGRAPHER, WASHINGTON, D. C.

UNITED STATES PATENT OFFICE.

MOSES ATWOOD, OF NEW SHARON, IOWA.

IMPROVEMENT IN RUNNING-GEARS.

Specification forming part of Letters Patent No. 191,017, dated May 22, 1877; application filed March 24, 1877.

*To all whom it may concern:*

Figure 1:
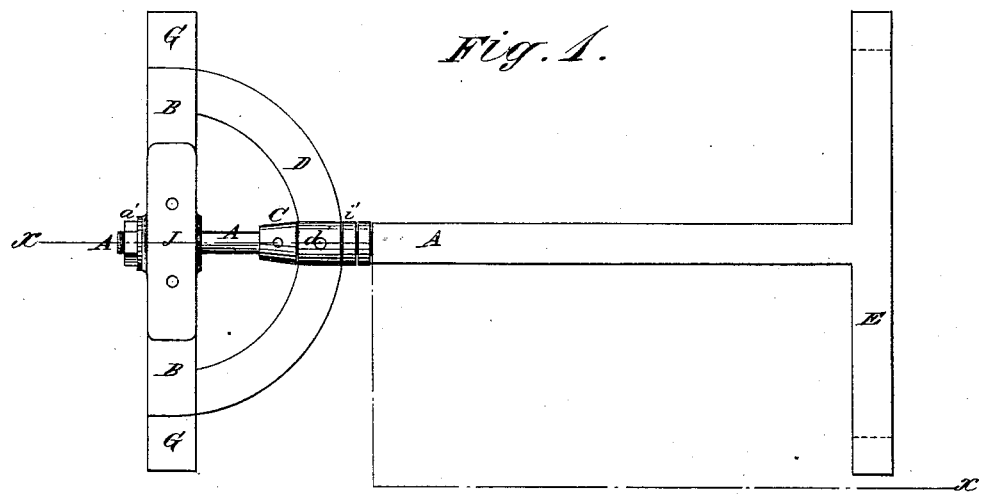
Figure 2:
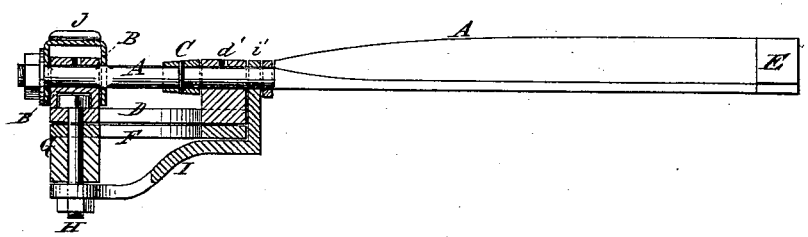

Be it known that I, MOSES ATWOOD, of New Sharon, in the county of Mahaska and State of Iowa, have invented a new and useful Improvement in Wagon-Gearing, of which the following is a specification:

Figure 1 is a top view of the reach and axles of a wagon-gearing to which my improvement has been applied. Fig. 2 is a side view of the same, partly in section, through the line $x\, x$, Fig. 1.

Similar letters of reference indicate corresponding parts.

The object of this invention is to furnish a running-gear which shall be so constructed that either of the wheels may rise above or sink below a level in passing over obstructions or depressions without straining the gearing or body.

The invention consists in the combination of the rounded forward part of the reach, the head-block, the fifth-wheel, the forward axle, the king-bolt, the brace, the collar, and the saddle with each other, in the manner hereinafter fully described.

A is the reach, the rear end of which is secured to the rear axle E. The forward part of the reach A is rounded off, passes through the head-block B, and has a nut, $a'$, screwed upon its forward end. The rounded forward part of the reach A also passes through an eye, $d'$, formed upon the upper circle D of the fifth-wheel, the forward or straight part of which is securely bolted to the head-block B.

F is the lower circle of the fifth-wheel, which fits against the under side of the upper circle D. The forward or straight part of the lower circle F is bolted to the forward axle G.

H is the king-bolt, the head of which is embedded in the lower side of the head-block B, and which passes down through the upper circle D, the lower circle F, the axle G, and the forward end of the brace I, and has a nut screwed upon its lower end.

The brace I is curved upward and rearward, so as to pass beneath, and serve as a guide and seat for, the lower circle F of the fifth-wheel; and its upper end is bent upward, and has an eye, $i'$, formed in it, through which the rounded forward part of the reach A passes.

To the rounded forward part of the reach A is secured a collar, C, which rests against the forward side of the eye $d'$ of the upper circle D, to relieve the nut upon the forward end of the reach A from having to sustain all the draft.

J is the saddle, to which the springs or the spring-bar of the wagon-body are attached, and upon the middle part of which are formed lugs, the forward one of which has a round hole formed through it to receive the rounded forward part of the reach A. The rear lug of the saddle J has a square hole formed through it, to receive a square formed upon the rounded forward part of the reach A, so as to hold the saddle J always parallel with the rear axle E, and thus keep the wagon-body and the gearing from being strained or twisted by the upward or downward movement of any of the wheels.

Having thus described my invention, I claim as new and desire to secure by Letters Patent—

The combination of the rounded forward part of the reach A, the head-block B, the fifth-wheel D F, the forward axle G, the king-bolt H, the brace I, the collar C, and the saddle J with each other, in substantially the manner herein shown and described.

MOSES ATWOOD.

Witnesses:
GEO. A. ROBERTS,
E. A. KIBBE.